United States Patent
Maes et al.

(10) Patent No.: US 6,625,298 B1
(45) Date of Patent: Sep. 23, 2003

(54) METHOD AND SYSTEM FOR EMBEDDING EXTRA INFORMATION, METHOD AND SYSTEM FOR DECODING

(75) Inventors: Maurice Jerome Justin Jean-Baptiste Maes, Eindhoven (NL); Geert Florimond Gerard Depovere, Eindhoven (NL); Antonius Adrianus Cornelis Maria Kalker, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 218 days.

(21) Appl. No.: 09/857,915

(22) PCT Filed: Oct. 10, 2000

(86) PCT No.: PCT/EP00/10001

§ 371 (c)(1),
(2), (4) Date: Jun. 11, 2001

(87) PCT Pub. No.: WO01/28230

PCT Pub. Date: Apr. 19, 2001

(30) Foreign Application Priority Data

Oct. 12, 1999 (EP) .............................................. 99203325

(51) Int. Cl.⁷ .................................................. H04K 1/00
(52) U.S. Cl. ........................ 382/100; 348/461; 380/210
(58) Field of Search ................................ 382/100, 232; 713/176; 380/202, 210, 252, 287; 348/461, 467

(56) References Cited

U.S. PATENT DOCUMENTS

| | | | | |
|---|---|---|---|---|
| 5,721,788 A | * | 2/1998 | Powell et al. ................ | 382/100 |
| 6,373,960 B1 | * | 4/2002 | Conover et al. ............ | 382/100 |
| 6,381,367 B1 | * | 4/2002 | Ryan .......................... | 382/232 |

FOREIGN PATENT DOCUMENTS

| | | | | |
|---|---|---|---|---|
| EP | 0 899 688 A2 | * | 3/1999 | ........... G06T/11/00 |
| EP | 0 928 110 A2 | * | 7/1999 | ........... H04N/7/26 |
| WO | WO 98/31152 A2 | * | 7/1998 | ........... H04N/7/50 |
| WO | WO 99/18723 A1 | * | 4/1999 | .......... H04N/5/913 |
| WO | WO 99/45704 A2 | * | 9/1999 | .......... H04N/5/913 |

OTHER PUBLICATIONS

Wu et al., "Video Access Control Via Multi–level Data Hiding," *Proc. IEEE Int. Conf. on Multimedia and Expo*, Jul./Aug. 2000, pp. 381–384.*
Mobasseri, "Direct Sequence Watermarking of Digital Video using m–frames," *IEEE Proc. 1998 Int. Conf. on Image Processing*, vol. II, Oct. 1998, pp. 399–403.*
Linnartz et al., "MPEG PTY–Marks: Cheap Detection of embedded Copyright Data in DVD– Video," *Proc. 5ᵗʰ European Symp. on Research in Computer Security (ESORICS'98)*, LNCS vol. 1485, Sep. 1998, pp. 221–240.*
Klain, "Will Science Soon Trace Pirate Lairs? Invisible Mark to Speed Guilt," *Variety*, Jul. 1, 1981, pp. 5, 33.*

* cited by examiner

*Primary Examiner*—Andrew W. Johns
(74) *Attorney, Agent, or Firm*—Russell Gross

(57) ABSTRACT

The invention relates to a method and a system (100) for embedding extra information in an input signal (101). Groups of one or more candidate frames in the input signal (101) are associated with respective portions of the extra information. Each group is edited in dependence on its associated respective portion, for example by deleting it to represent a zero bit in the respective portion and duplicating it to represent a one. The invention further relates to a method and system (200) for decoding extra information embedded in an input signal (201) by comparing it with an original input signal (204) and decoding the differences into the extra information. For example, missing groups of candidate frames are decoded into a zero bit, and duplicated candidate frames are decoded into a one bit.

8 Claims, 1 Drawing Sheet

Figure 1:
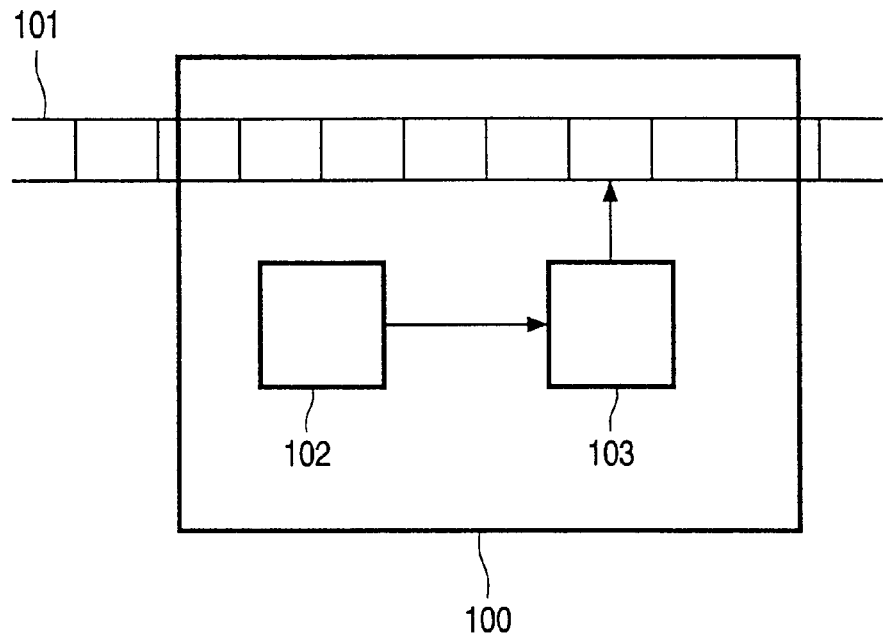

METHOD AND SYSTEM FOR EMBEDDING EXTRA INFORMATION, METHOD AND SYSTEM FOR DECODING

The invention relates to a method of embedding extra information in an input signal.

The invention further relates to a system for embedding extra information in an input signal.

The invention further relates to a method of decoding extra information embedded in an input signal.

The invention further relates to a system for decoding extra information embedded in an input signal.

In a Digital Cinema Theatre, very high quality digital video material, typically 1920×1080, 30-bit RGB, is projected on a large screen. Because of the extremely high video quality, this material needs protection against unauthorized copying. A straightforward way to obtain a copy of the projected video material is by simply using a video camera. Today, content providers are facing the problem that good quality recordings are being made in that way, and that illegal copies of these recordings are being sold.

To fight this form of piracy, it would help if the particular cinema theatre, as well as possibly the projection date and time, could be identified from the illegal recording. Preferably, this theatre information is embedded in a way such that it is not obtrusive, such that it is not annoying to viewers, and such that it cannot be easily removed from the illegal recording.

A straightforward method to prevent the above-described scenario would be the following. At the time of projection, a unique number identifying the particular digital cinema theatre together with the time and date of projection are embedded into the video using some digital watermarking technology. This watermarking application, where users get a unique watermark, is usually called "fingerprinting". In this way, the illegal recording will contain the same watermark. Using a digital watermark detector, the identifier number can be retrieved from a copied tape and the "negligent" theatre can be identified.

However, the demands on the video watermarking technology are extremely high. The camcorder is likely not on axis to the projector and the screen is curved both horizontally and vertically. Hence, non-linear distortions will occur, making watermark detection very difficult. Further, there is also the 3:2 pull-down effect, caused by the different frame rates of the movie projector and the recorder, as well as re-sampling, etc. This makes this method less than optimally suited for this purpose.

It is an object of the invention to provide a method according to the preamble, which can embed the extra information in such a way that it can be reliably detected.

This object is achieved in a method according to the invention which comprises associating groups of one or more candidate frames in the input signal with respective portions of the extra information, and performing for each group an edit operation on the one or more candidate frames of that group in dependence on its associated respective portion. When the input signal has been modified in this fashion, the modifications can later be easily and reliably detected by comparing the input signal against an original version and detecting the performed edit operations on the candidate frames. The extra information preferably is an identifier for the theatre in which the modified input signal is to be shown, so that it can be identified later.

In an embodiment the edit operation comprises one of deleting the candidate frame from the input signal, duplicating the candidate frame in the input signal, inserting a new frame into the input signal before the candidate frame, and inserting a new frame into the input signal after the candidate frame. An advantage of this embodiment is that these edit operations are very easy to detect and virtually impossible to undo when only the edited input signal is available. For instance, if a candidate frame is deleted, this can be detected with a simple frame-by-frame comparison, yet the creator of an unauthorized copy cannot restore the candidate frame.

In a further embodiment the new frame is associated with the extra information. The new frame can, for example, comprise an image identifying the theatre in which the modified input signal is to be shown. This later allows easy identification of the theatre in which the unauthorized copy originated.

In a further embodiment the method further comprises inserting an indicator for the candidate frames into the input signal. Since there is always the possibility that some frames were edited due to external circumstances, for example a bad recording, it is advantageous to identify which frames are candidate frames, so that only those frames are considered in detecting the extra information. By inserting this identification into the input signal, it can be detected later. Preferably the indicator is inserted as a watermark.

In a further embodiment the candidate frames are frames that represent scene changes in the input signal. An advantage of this embodiment is that these frames can be edited with less risk that the rendering will later be adversely affected. For instance, deleting a frame that occurs at a scene boundary will, at worst, only make the scene boundary more abrupt.

It is a further object of the invention to provide a system according to the preamble, which can embed the extra information in such a way that it can be reliably detected.

This object is achieved in a system according to the invention which comprises associating means for associating groups of one or more candidate frames in the input signal with respective portions of the extra information, and editing means for performing for each group an edit operation on the one or more candidate frames of that group in dependence on its associated respective portion.

It is a further object of the invention to provide a method according to the preamble, which allows easy and reliable detection of the extra information.

This object is achieved in a method according to the invention which comprises comparing the input signal with an original input signal to obtain one or more differences between the input signal and the original input signal, and decoding the one or more differences as respective portions of the extra information. Comparing the input signal with an original version, preferably on a frame-by-frame basis, allows for easy detection of those frames that were edited. The nature of the edit operations that were performed, together with the location of the edited frames, can be used to determine the portions of the extra information.

It is a further object of the invention to provide a system according to the preamble, which allows easy and reliable detection of the extra information.

This object is achieved in a system according to the invention which comprises comparing means for comparing the input signal with an original input signal to obtain one or more differences between the input signal and the original input signal, and decoding means for decoding the one or more differences as respective portions of the extra information.

Figure 2:
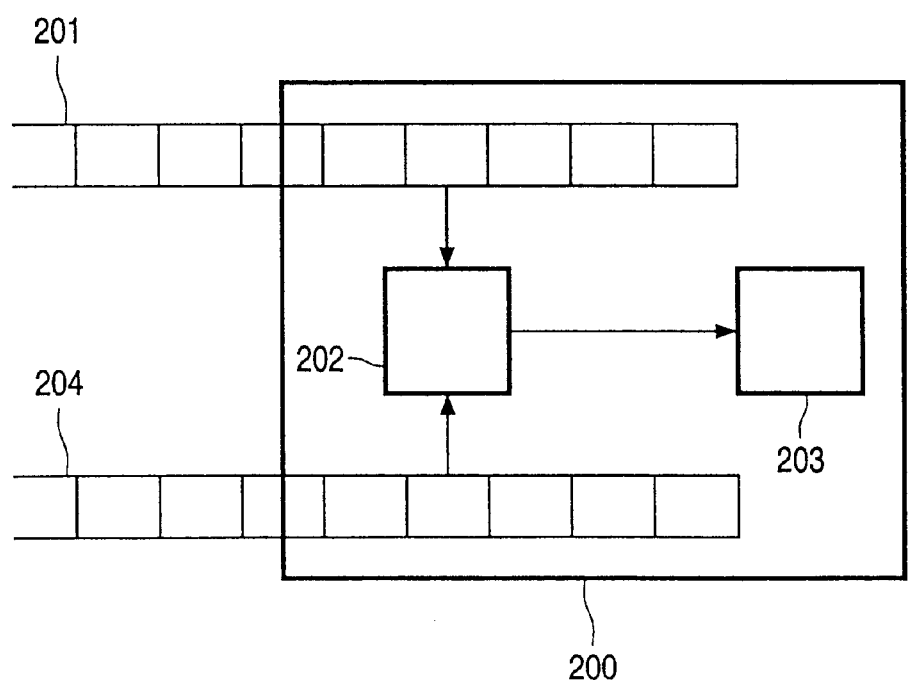

These and other aspects of the invention will be apparent from and elucidated with reference to the embodiments shown in the drawings, in which:

FIG. 1 schematically shows a system for embedding extra information in an input signal according to the invention; and FIG. 2 schematically shows a system for detecting extra information embedded in an input signal according to the invention.

Throughout the figures, same reference numerals indicate similar or corresponding features. Some of the features indicated in the drawings are typically implemented in software, and as such represent software entities, such as software modules or objects.

FIG. 1 schematically shows a system 100 for embedding extra information in an input signal 101. The system 100 comprises associating means 102 and editing means 103. The extra information can be anything, but preferably is an identifier of the digital cinema theatre in which the input signal 101 is to be presented after it has been modified. This identifier can for example be a sequence of bits, where each sequence uniquely identifies one theatre. The input signal 101 preferably is a video signal, but may also be an audio signal or some other kind of signal. The system 100 is preferably located in a Digital Cinema Theatre, so that the extra information can be embedded during or just before the actual projection to the audience.

The associating means 102 associate groups of one or more candidate frames in the input signal 101 with respective portions of the extra information. First, the available candidate frames need to be identified. This identification can be done outside the system 100, in which case the locations of the candidate frames need to be communicated to the associating means 102 beforehand. Alternatively, the associating means 102 may be arranged to detect scene changes in the input signal 101 and to identify the frames that represent said scene changes as candidate frames. The associating means 102 could also simply pick one frame at regularly spaced distances in the input signal, for instance once every one thousand frames. This last alternative is very simple to implement, but may cause visual distortions in the input signal.

When the candidate frames are identified, they are then grouped. Each group is associated with a respective portion, preferably a single bit, of the extra information. Assume for instance that there are a thousand candidate frames and twenty bits of extra information to embed. There are now several ways to associate the groups with respective portions. A simple and preferred way is to form twenty groups of fifty candidate frames and to associate the first fifty candidate frames with the first portion, the next fifty candidate frames with the second portion, and so on, until the final fifty candidate frames have been associated with the twentieth portion. An alternative way is to create forty groups of twenty-five candidate frames, and to associate the first twenty groups and the last twenty groups separately as described above. This way, the extra information is embedded twice, which makes the embedding more reliable. Of course, other ways to group the candidate frames also exist.

When the groups have been formed, the editing means 102 perform for each group an edit operation on the one or more candidate frames of that group in dependence on its associated respective portion. This edit operation should represent the information in that portion. When the portion is a single bit, then the edit operation can be used to represent a one or a zero in the candidate frames of the group. For instance, deleting the candidate frames can be used to represent a one, and not deleting the candidate frames, the null operation, can be used to represent a zero.

Other edit operations, such as duplicating the candidate frame in the input signal 101, inserting a new frame into the input signal 101 before the candidate frame, and inserting a new frame into the input signal 101 after the candidate frame can also be used. For instance, candidate frames can be deleted to represent a zero, and be duplicated to represent a one. It is not necessary to use only two edit operations, although this is preferred for reasons of simplicity. The edit operation is preferably performed on all candidate frames of the group in question, which makes the method more robust.

If a new frame is to be inserted, it is preferably associated with the extra information. The new frame can, for example, comprise an image identifying the theatre in which the modified input signal 101 is to be shown. This later allows easy identification of the theatre in which the unauthorized copy originated.

Since the way in which the candidate frames were selected and grouped may not be known beforehand, it can be advantageous to insert an indicator for the candidate frames into the input signal 101. This preferably is done by means of a digital watermark, so that it is unobtrusive to viewers when the input signal 101 is shown. This indicator can for instance indicate that every 100'th frame is a candidate frame. It may also be inserted on the candidate frames themselves, so that they can be identified as such by a detecting system.

To illustrate the method further, consider the following example. Suppose there are 10,000 theatres in which the input signal 101 is to be shown. Each theatre can be assigned a unique 15 bit number, the projector key K. Suppose further that a the input signal lasts 90 minutes and has one candidate frame for deletion every five seconds, so in total there are 1080 candidates. These 1080 frames can then be partitioned in 15 groups of 72 frames each. The editing means 103 then deletes the frames in the m-th group if and only if the m-th bit of K equals 1, and performs the null operation otherwise. So, a key K=100101111111001 would result in deleting frames 1 to 72, 217 to 288, 361 to 864, and 1009 to 1080.

FIG. 2 schematically shows a system 200 for detecting extra information embedded in an input signal 201. The system 200 comprises comparing means 202 and decoding means 203. The input signal 201 preferably has the extra information embedded as described above with reference to FIG. 1.

The comparing means 202 compares the input signal 201 with an original input signal 204 to obtain one or more differences between the input signal 201 and the original input signal 204. This is preferably done on a frame-by-frame basis. The differences that are obtained can be frames that are missing in the input signal 201 but present in the original input signal 204, frames that occur twice in the input signal 201 and once in the original input signal 204, frames that are present in the input signal 201 but missing in the original input signal 204, and so on. The comparing means 202 sends information regarding these differences to the decoding means 203.

The decoding means 203 decodes the one or more differences as respective portions of the extra information. It may be necessary to read an indicator inserted into the input signal 201 to determine the location of the candidate frames. Differences that do not relate to candidate frames are ignored, if they are present. Since the candidate frames are grouped, the detected differences should be grouped as well. This allows the system 200 to cope with single-frame errors. For instance, if the edit operation was duplicating the candidate frames, and one such duplicate was accidentally dropped from the input stream 201, then the fact that all the other candidate frames of that group are duplicated provides sufficient information to conclude that that group was duplicated and the single missing duplicate was an error.

The one or more differences can be decoded into portions of the extra information depending on their encoding method. For instance, if deleting the candidate frames was used to represent a one, and not deleting the candidate frames, the null operation, was used to represent a zero, then the absence of a candidate frame in the input signal 201 is decoded into a one. If the candidate frame is present, in other words if no difference is detected, then this fact is decoded into a zero.

In the example given with reference to FIG. 1, a key K was embedded by deleting candidate frames 1 to 72, 217 to 288, 361 to 864, and 1009 to 1080 from the input signal 101. Using this example, the decoding means 203 receives from the comparing means 202 the information that those frames are missing from the input signal 201. The encoding method used comprised deleting a group of candidate frames to indicate a one, and not deleting to indicate a zero. So, the decoding means 203 now decodes the fact that candidate frames 1 to 72 were deleted into a one for the first portion of the extra information, the fact that candidate frames 73 to 216 were not deleted into zeroes for the second and third portions, and so on. Thus, the original key K=100101111111001 is obtained.

What is claimed is:

1. A method of embedding extra information in an input signal (101), comprising associating groups of one or more candidate frames in the input signal (101) with respective portions of the extra information, and performing for each group an edit operation on the one or more candidate frames of that group in dependence on its associated respective portion, wherein the edit operation is selected from a group consisting of deleting a candidate frame from the input signal (101), duplicating a candidate frame in the input signal (101), inserting a new frame into the input signal (101) before a candidate frame, and inserting a new frame into the input signal (101) after a candidate frame.

2. A method as claimed in claim 1, whereby the new frame is associated with the extra information.

3. A method as claimed in claim 1, further comprising inserting an indicator for the candidate frames into the input signal (101).

4. A method as claimed in claim 3, whereby the indicator is inserted as a watermark.

5. A method of embedding extra information in an input signal (101), comprising associating groups of one or more candidate frames in the input signal (101) with respective portions of the extra information, and performing for each group an edit operation on the one or more candidate frames of that group in dependence on its associated respective portion, wherein the candidate frames are frames that represent scene changes in the input signal (101).

6. A system (100) for embedding extra information in an input signal (101), comprising associating means (102) for associating groups of one or more candidate frames in the input signal (101) with respective portions of the extra information, and editing means (103) for performing for each group an edit operation on the one or more candidate frames of that group in dependence on its associated respective portion, wherein the edit operation is selected from a group consisting of deleting a candidate frame from the input signal (101), duplicating a candidate frame in the input signal (101), inserting a new frame into the input signal (101) before a candidate frame, and inserting a new frame into the input signal (101) after a candidate frame.

7. A method of decoding extra information embedded in an input signal (201), comprising comparing the input signal (201) with an original input signal (204) to obtain one or more differences between the input signal (201) and the original input signal (204), and decoding the one or more differences as respective portions of the extra information, wherein the differences are selected from a group consisting of a candidate frame deleted from the input signal (101), a candidate frame duplicated in the input signal (101), a new frame inserted into the input signal (101) before a candidate frame, and a new frame inserted into the input signal (101) after a candidate frame.

8. A system (200) for decoding extra information embedded in an input signal (201), comprising comparing means (202) for comparing the input signal (201) with an original input signal (204) to obtain one or more differences between the input signal (201) and the original input signal (204), and decoding means (203) for decoding the one or more differences as respective portions of the extra information, wherein the differences are selected from a group consisting of a candidate frame deleted from the input signal (101), a candidate frame duplicated in the input signal (101), a new frame inserted into the input signal (101) before a candidate frame, and a new frame inserted into the input signal (101) after a candidate frame.

* * * * *